(12) United States Patent
Abuelsaad et al.

(10) Patent No.: US 10,057,289 B2
(45) Date of Patent: Aug. 21, 2018

(54) ADJUSTING MULTI-FACTOR AUTHENTICATION USING CONTEXT AND PRE-REGISTRATION OF OBJECTS

(71) Applicant: International Business Machines Corporation, Armonk, NY (US)

(72) Inventors: Tamer E. Abuelsaad, Somers, NY (US); Vishal C. Aslot, Austin, TX (US); Adekunle Bello, Pflugerville, TX (US); Gregory J. Boss, Saginaw, MI (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 13/964,540

(22) Filed: Aug. 12, 2013

(65) Prior Publication Data

US 2015/0046969 A1 Feb. 12, 2015

(51) Int. Cl.
*G06F 7/04* (2006.01)
*H04L 29/06* (2006.01)
(Continued)

(52) U.S. Cl.
CPC .............. *H04L 63/20* (2013.01); *G06F 21/41* (2013.01); *G06F 21/6218* (2013.01);
(Continued)

(58) Field of Classification Search
CPC ....... H04L 63/20; H04L 63/107; H04L 63/08; H04L 63/0428; G06F 21/41; G06F 21/6218; G06F 2221/2103; G06F 2221/2149; G06F 21/31
See application file for complete search history.

(56) References Cited

U.S. PATENT DOCUMENTS

| 6,853,988 B1 | 2/2005 | Dickinson et al. |
| 7,086,085 B1 * | 8/2006 | Brown ............... G06F 21/31 |
| | | 714/E11.207 |

(Continued)

FOREIGN PATENT DOCUMENTS

WO 2004042540 A2 8/2013

OTHER PUBLICATIONS

Al-Muhtadi et al, "Cerberus: A Context-Aware Security Scheme for Smart Spaces", Pervasive Computing and Communications, Mar. 2003, IEEE.

*Primary Examiner* — Ali S Abyaneh
(74) *Attorney, Agent, or Firm* — Scully, Scott, Murphy & Presser, P.C.; Kurt P. Goudy, Esq.

(57) ABSTRACT

A system and method and computer program product for user authentication that uses information about a user's context or context of their personal device(s) to dynamically modify that user's authentication or login requirements to an application in a computer or mobile device. The system is configured to run methods that detect and make use of a user's context that includes: a current environment or personal context, and uses this capability to enable variable strength authentication when attempting to log in or enter another application or resource. In one embodiment, the system implements methods to dynamically adjust the authentication challenge as a differential of all accumulated user contexts (e.g., providing a shorter password or pincode).

20 Claims, 6 Drawing Sheets

(51) Int. Cl.
*G06F 21/41* (2013.01)
*G06F 21/62* (2013.01)
*H04W 12/06* (2009.01)

(52) U.S. Cl.
CPC ..... *H04W 12/06* (2013.01); *G06F 2221/2103* (2013.01); *G06F 2221/2149* (2013.01); *H04L 63/107* (2013.01)

(56) References Cited

U.S. PATENT DOCUMENTS

| | | | |
|---|---|---|---|
| 8,181,858 B2 | 5/2012 | Carter et al. | |
| 8,321,913 B2* | 11/2012 | Turnbull | H04L 63/0492 726/2 |
| 8,584,219 B1* | 11/2013 | Toole | G06F 21/60 726/25 |
| 9,264,231 B2* | 2/2016 | Dean | G06F 21/35 |
| 2008/0172715 A1* | 7/2008 | Geiger | G06F 21/32 726/1 |
| 2008/0263652 A1 | 10/2008 | McMurtry et al. | |
| 2009/0133106 A1 | 5/2009 | Bentley et al. | |
| 2009/0158425 A1* | 6/2009 | Chan | G06F 21/60 726/21 |
| 2010/0024017 A1* | 1/2010 | Ashfield | G06F 21/35 726/7 |
| 2010/0114776 A1 | 5/2010 | Weller et al. | |
| 2011/0225625 A1* | 9/2011 | Wolfson | H04L 63/08 726/1 |
| 2011/0239276 A1* | 9/2011 | Garcia Garcia | H04L 63/102 726/4 |
| 2011/0314558 A1* | 12/2011 | Song | G06F 21/316 726/28 |
| 2012/0201381 A1* | 8/2012 | Miller | H04L 9/16 380/255 |
| 2014/0344271 A1* | 11/2014 | Bartram | G06Q 10/10 707/737 |

* cited by examiner

| ACTIONS | AUTHENTICATION POINTS |
|---|---|
| COMPANY POLICY STATES REQUIRED AUTHENTICATION POINTS IS 10 | 10 |
| USER OWNED AUTHENTICATED LAPTOP IS DETECTED WITHIN PROXIMITY TO MOBILE DEVICE | 5 |
| THE MOBILE DEVICE USER TRYING TO AUTHENTICATE TO IS ON THE COMPANY'S INTRANET | 4 |
| CALCULATE DELTA AUTHENTICATION POINTS NEEDED AND PRESENT OPTIONS TO USER | 2 |

FIG. 4

| ARTICLE ID | ARTICLE TYPE | AUTHENTICATION POINTS | DETECTED |
|---|---|---|---|
| MBL-CEL-125-111 | SMART PHONE | 4 | |
| INTRANET-2345-981 | COMPANY'S INTRANET | 3 | ✓ |
| PIN-NUM-456-098 | 4 CHARACTER PIN | 2 | |
| LAPTOP-334S12-331 | WORK LAPTOP | 5 | ✓ |
| PASSWORD-999-999 | FULL PASSWORD | 10 | |

FIG. 7

ADJUSTING MULTI-FACTOR AUTHENTICATION USING CONTEXT AND PRE-REGISTRATION OF OBJECTS

TECHNICAL FIELD

The disclosed technology is generally related to computing infrastructure services, and in particular, to user authentication operations for mobile device and other computing platforms.

BACKGROUND

There are many types of user authentication schemes implemented when a user attempts to login a device, e.g., a mobile phone, computer, for communicating with, running an application in and/or accessing data from a secure computing system/network. Regardless of the user device, each login attempt requires the same user password. Current password authentication schemes often frustrate users because of the frequency and complexity of password(s) which need to be entered on phones, computers and applications at each attempt.

Currently, existing user authentication schemes do not implement or use information about a user's context or context of their personal device(s) to dynamically modify that user's authentication or login requirements to an application in a computer or mobile device.

SUMMARY

A system and method and computer program product for user authentication that uses information about a user's context or context of their personal device(s) to dynamically modify that user's authentication or login requirements to an application in a computer or mobile device.

Particularly, the system, method and computer program product detects and makes use of a user's context that includes: a current environment or personal context, and uses this capability to enable variable strength authentication.

A system and method and computer program product that detects a current user context relating to a device use requiring a certain authentication, and generate an authentication strength rating according to the detection. Based on the generated authentication strength rating, a login authentication requirement may be stepped-down when logging into a computer or mobile device.

A system and method and computer program product that enables user's authentications into mobile and computing systems by dynamically adjusting the authentication challenge as a differential of all accumulated user contexts.

In one embodiment, the method takes into account contextual information that is not authentication based in order to identify a risk assessment. This assessment can be positive or negative and cumulative. This contextual information and associated risk assessment is then used to modify the authentication requirements themselves.

There is provided, in one aspect, a method for authenticating a user device requesting access to a system or network resource of an entity. The method comprises: determining, via the user device, a context of the user; logging in the device, based on each determined the user context, an individual risk value associated with the end user; computing an aggregated risk value based on the individual risk values logged for each determined end user context; and using the aggregate risk value to dynamically modify an authentication rule used to authenticate the user.

In a further aspect, there is provided a system for authenticating a user device requesting access to a system or network resource of an entity. The system comprises a memory storage device; a processor unit in communication with the memory device, the processor unit configured to: determine, via the user device, a context of the user; log in the device, based on each determined the user context, an individual risk value associated with the end user; compute an aggregated risk value based on the individual risk values logged for each determined end user context; and use the aggregate risk value to dynamically modify an authentication rule used to authenticate the user.

A computer program product is provided for performing operations. The computer program product includes a storage medium readable by a processing circuit and storing instructions run by the processing circuit for running methods. The storage medium readable by a processing circuit is not a propagating signal. The methods are the same as listed above.

BRIEF DESCRIPTION OF THE DRAWINGS

The objects, features and advantages of the disclosed technology will become apparent to one skilled in the art in view of the following detailed description taken in combination with the attached drawings, in which.

DETAILED DESCRIPTION

There is introduced a system and method enabling a business to have and maintain robust authentication requirements, while a user does not have to bear the burden of meeting all authentication requirements based on their context.

In one instance, when a user is in a secure location from which his/her identity can be easily inferred, then the method adjusts, i.e., reduces, the authentication credentials required. For example, a reduced authentication credential may include the use of a simplified 4 character pin, a visible pattern/gesture, or other simplified password.

Figure 1:
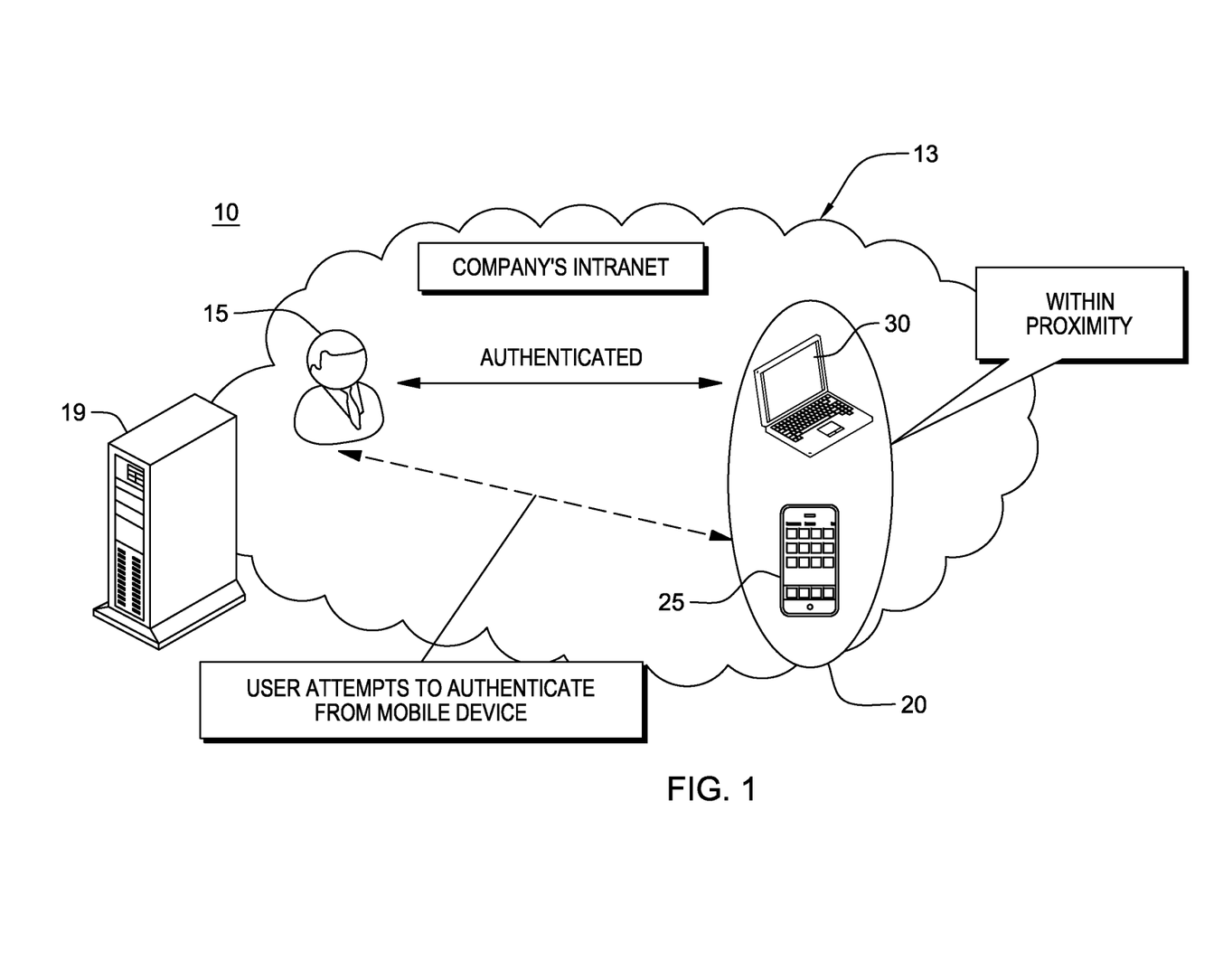
FIG. 1 symbolically shows one example of a system in which the disclosed technology may be operated according to one embodiment.

FIG. 1 conceptually depicts a system 10 for dynamically adjusting the authentication requirements of a business or entity. As shown in one example implementation the system includes a company intranet 13, i.e., a network of distributed interconnected computing devices, which may include wireless and/or wired communications network(s). The system 10 comprises computing device(s) that is(are) programmed to determine a context of an end user. In one embodiment, the context includes a determined location of the user's device or system. Alternatively, or in addition, the determined context 20 may includes a user's devices' proximity within or relative to another of that user's devices.

For example, in view of FIG. 1, if a user 15 is attempting to authenticate to a company e-mail system (via intranet 30) on that user's smart-phone 25 which normally requires an 8-digit alphanumeric password, and the user's context includes: 1) a location that is detected within a company building or premises, e.g., a user may be in a location from which his/her identity can be obtained or inferred, and 2) the user's smart-phone 25 is within a certain pre-established distance, e.g., within 10 feet of that user's other device that is already authenticated, a laptop 30, then the system responds by modifying the normal authentication requirement, e.g., to only require a pattern unlock code or a shorter password or pin-code entry.

In a non-limiting example, to obtain a user's location from which his/her identity can be obtained, the user's mobile phone 25 may be programmed to detect its current location (e.g., via use of a Global Positioning System (GPS)) and runs a process that detects a matching or verifying that the obtained location coordinates are within the company's campus location (or within defined geographic boundaries). The company e-mail system responds by authorizing a user action with a reduced authentication credential requirement.

In one embodiment, the system and method takes into account contextual information that is not authentication based in order to identify a risk assessment. This assessment can be a positive or negative value or this value may be cumulative. The contextual information and associated risk assessment is then used to modify the authentication requirements themselves (e.g., providing a shorter password or pin-code). As an example, a negative risk assessment may include moving away from an area originally asserted as secure, for example, the user's phone is some distance from the laptop that was used to provide a reduced authentication context.

In one embodiment, the system logs, based on the user context, an individual risk value for each measured context associated with the user.

For example, while attempting to authenticate to a company e-mail system in the above-described example implementation, a computer system is programmed to implement a strong authentication policy, e.g., 8-digit login for each of two times. This policy for this type of system authentication may implement a rule requiring a corresponding pre-determined amount of authentication points equivalent to the full required authentication scheme for that device (e.g., 8-digit alphanumeric password). However, from this established number of authentication points, e.g., ten (10) points, the system requires the determining an amount of authentication points earned (a risk modification value) based on each of the determined user's context(s). For example, the detecting of a user's location within a company building or premises and detecting that the user's mobile phone is located within a certain pre-established distance from another authenticated device owned by that user, this may correspond to 5 points, for example. This value is used to modify the user's authentication requirement for logging into the system from that mobile phone. The system generates a delta value (i.e., the full authentication points and the points aggregated or gained based on the user context) is generated, and this delta value becomes a new requirement. The full authentication requirements of the business or company is upheld while reducing the burden of the user when authenticating via that device.

Figure 2:
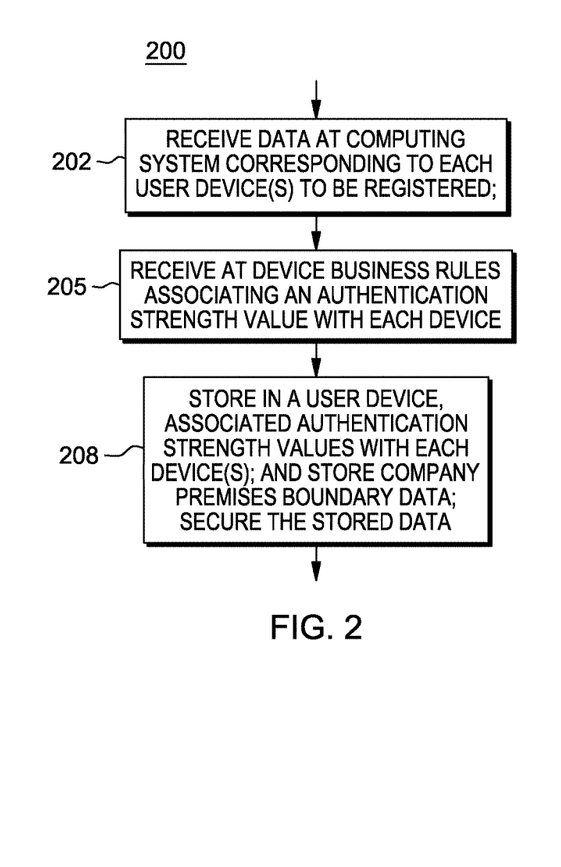
FIG. 2 depicts a method for pre-registering articles or devices such as mobile phones, mobile computing devices, etc., within a company network infrastructure according to one embodiment.

FIG. 2 depicts a method 200 for pre-registering objects, i.e., devices such as mobile phones, mobile computing devices, etc., with the system application running in the company network infrastructure. Pre-registration is required so that the device, when registered, can access an application(s) of a company's infrastructure or intranet, e.g., access a wireless e-mail application with reduced authentication requirements as described herein. Pre-registration is further required so that the device's location and other contexts are discoverable or inferable. At 202, the company or authorizing entity will register each user device. Then, once registered at 205, the business, company or authorizing entity provides a download or otherwise communicates to the device to be registered one or more business rules for input and storage therein.

Each participating/preregistered user device is provided with an input mechanism to capture the business rule that maps a device's context scenario to a corresponding risk value assessment corresponding to an authentication point value used in determining a particular (reduced) authentication challenge. The program communicates or incorporate the business rule within itself or a though a "back-end" communication channel, e.g., a wired/wireless network connection. In one embodiment, a back-end channel may include a communication with a policy engine or application, embodied in a network server device 19, shown in FIG. 1, from which a user device, e.g., mobile phone 25 can receive the business rules mapping various user contexts with an associated risk value. As shown in the Table 400 of FIG. 4, each business rule (or policy) 401 includes a mapping to a corresponding authentication point value ("points") 402 based on assessed risk values corresponding to various user contexts. For example, the number of authentication points ("points") or associated risk value associated with that context may be based on how easily a user context can be compromised. In one embodiment, an associated risk value is a threshold corresponding to a number of authentication points as deemed appropriate by a business or entity for the type of device/device interaction. This number of authentication points corresponds or is mapped to an authentication challenge for that device in the business rule. A corresponding full authentication presentation or challenge may be set to include one or more of: a password length, a frequency of password entry, a password type (none, pattern, pin, password, etc.).

Referring back to FIG. 2 at 208, the mobile device 25 stores received one or more business rules in the user's device(s). Additionally, at 208, a business rule may indicate boundary coordinates of an area, e.g., company premises, in the form of boundaries or plural longitudinal/latitudinal coordinates in which device use is sanctioned, is stored for authentication use in the user's device. Optionally, all stored authentication and business rule data information may specify user contexts such as user devices (e.g. iPad, cell phone, computer); a location (e.g. home, work, public), or a device interaction (e.g. a vehicle, plane, etc).

Figure 4:
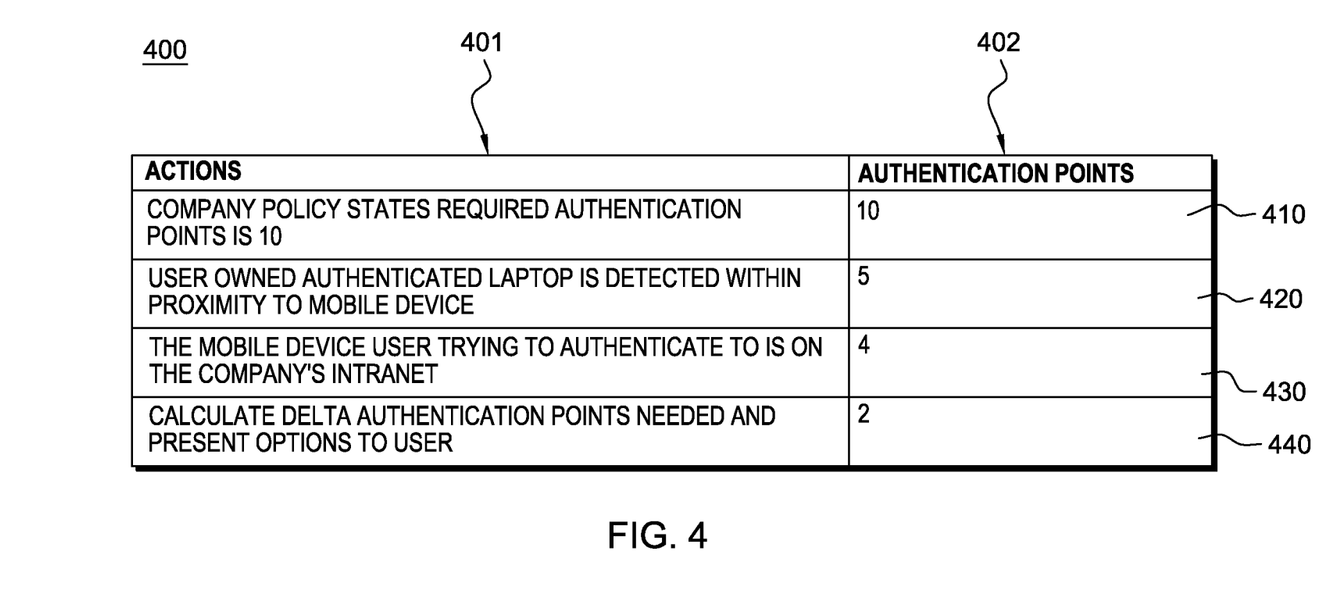
FIG. 4 depicts a Table 400 of business rules (or policy rules) that includes a mapping of user device contexts to a corresponding authentication point value based on assessed risk values corresponding to the user contexts.

One example rule and manner of storage is depicted in the table 400 depicted in FIG. 4 depicting rules indicating authentication actions taken and a corresponding points value. For security measures, the data stored in Table 400 may be encrypted. At 410, for the indicated authentication action taken, e.g., from a user's cell phone, the required number authentication points needed is ten (10) for authenticating user's cell phone access to company's resource, such as a company's data center network. The total number of authentication points is set. Then, upon detection of user contexts, the rule 412 indicates the user context type and its mapping to an authentication points value. For example, at 420, one context mapped to a points value is if the user (user's device 25) is detected within boundaries of company premise, and within a certain proximity to another authenticated device 30 of that user, the certain point value, is 5 points for example. As another example, at 430, if the user's current device has connected to another resource, e.g., a company intranet, this maps to another authentication points value, e.g., 3 points. Known methods are used to determine whether the device is connected to another resource. For example, the application may receive pieces of data for each context discovered and the application computes an authentication strength. Finally, at 440, FIG. 4, the rule will indicate a delta value corresponding to the amount of authentication points needed and present the option to the user.

Referring to FIG. 1, in one embodiment, the rule and point value determination may be applied by an application running in a mobile device application or by cooperatively communicating/interacting with operating server 19 equipped with processing resources to compute an accumulated points value aggregated based on received aggregated user contexts and map that value to a corresponding manner in which the authentication challenges is to be presented to the user via that user device. In one embodiment, the application matches the received data with that stored in the table stored on the user device, e.g., phone.

In this method, the authentication challenge format presented to the user in applying the rule for that device is an associated authentication strength that is reduced based on detected context(s), however maintains compliance with the business rule associated with the risk assessed for that user context(s). For the mobile phone authenticating example, assuming the contexts and associated authentication points values stored in the Table 400 of FIG. 4, the processing resources compute a difference (required number authentication points needed (10 points) minus current aggregated user context (e.g., 9 points), which is indicated as an authentication challenge according to (2) points, in this example, which is of reduced complexity as compared to the user authentication challenge according to a 10 point value. In other embodiments, it may resolve to a challenge according to a 1 point value.

Figure 3A:
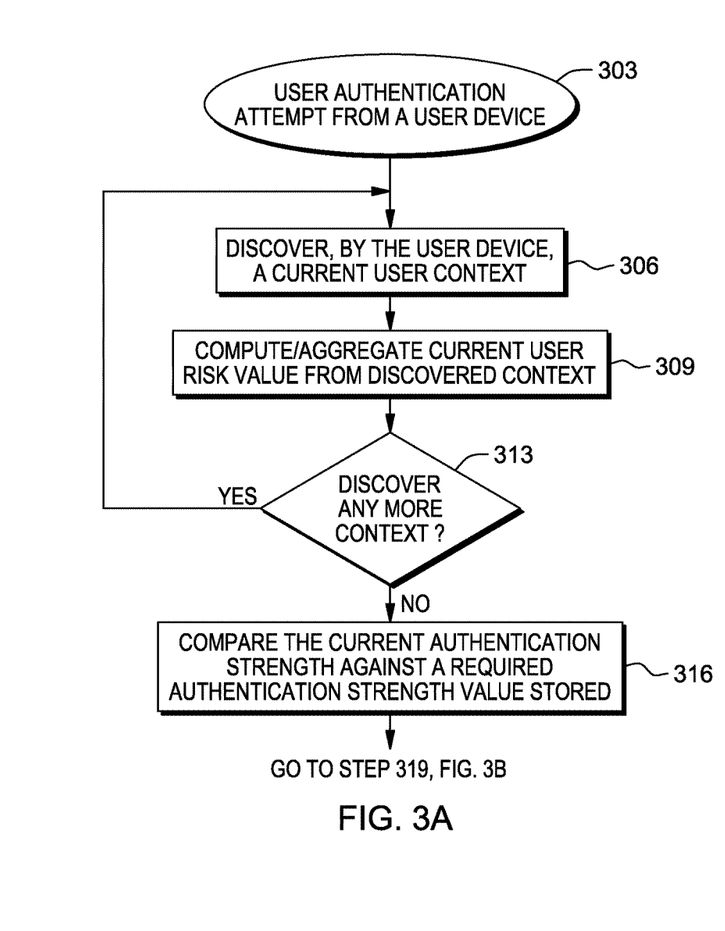
FIGS. 3A-3B depict a method for adjusting multi-factor authentication as programmed in to a user device that could be authenticated according to one embodiment.
Figure 3B:
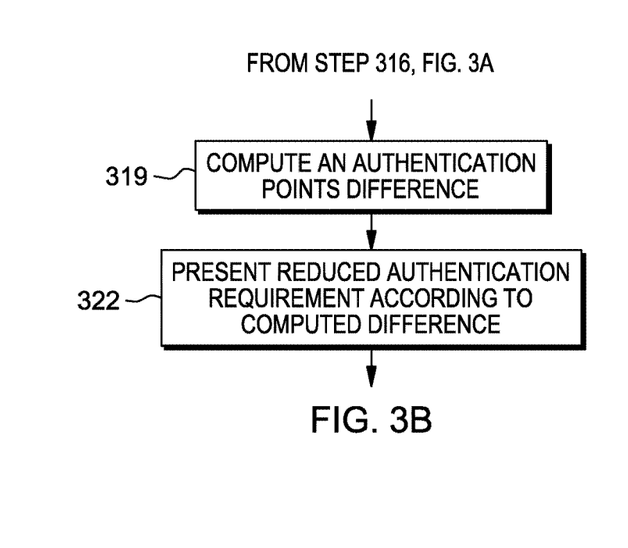

FIG. 3A depicts a method 300 for adjusting multi-factor authentication as programmed in to a user device that could be authenticated. At 303 a user attempts authentication from a user device. Then at 306 the user device discovers the user's current context and associated points value based on the rule. Then, at 309 there is computed an aggregate current user risk value from the discovered context. At 313, a determination is made as to whether any more device/user context is discoverable. If more user context is discoverable, the process returns to step 306 to discover the user's current context and then at 309 aggregate the associated points value based on the rule. The process steps 306, 309 and 313 are repeated so that for each piece of user context data is received, the application computes an aggregated authentication strength. Then, at 316, the method compares the current aggregated authentication strength against the total required authentication strength value stored to result in an authentication points difference computed at 319 in FIG. 3B to determine the authentication challenge format. Then at 322, the system presents to the authenticating requestor a reduced authentication requirement according to computed difference.

Figure 3C:
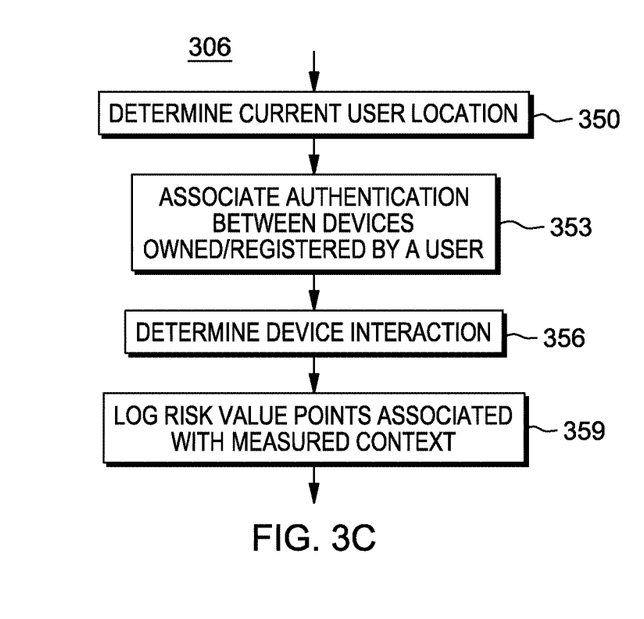
FIG. 3C describes method steps implemented for determining user context according to step 306, FIG. 3A according to one embodiment.

FIG. 3C describes detailed steps implemented for determining user context at step 306, FIG. 3A according to one embodiment. For non-limiting purposes of illustration, as shown in FIG. 1, a user device is a mobile phone 25, having a mobile application 26 that is able to communicate wirelessly with various devices, e.g., a laptop in its close proximity. In one embodiment, mobile application 26 is able to communicate wirelessly using now known (e.g., Bluetooth) or future unknown Near Field Communication (NFC) formats. The mobile application could also discover its current location using either the nearest cell tower or global positioning system (GPS) technology. Thus at 350, FIG. 3C, there is depicted the context discovery step of determine current user location. As a non-limiting example, discovery of the mobile device location may be performed using NFC or GPS. Then, at 353 there is performed associating an authentication between devices owned/registered by that user. Generally, the application gathers pieces of information that may identify the owner/user of the device from its proximity, e.g., within a determined threshold distance (e.g., within 20 feet). For example, the association may be between the user's mobile device 25 and his nearby laptop computer 30 via a Blue-tooth connection. Then, at 356, there is determined a device interaction, i.e., determining a current connection of the user's other device, e.g., the laptop. For example, server 19 in FIG. 1 may know that the user's laptop is already connected to another resource via a network connection. The system recognizes and receives data corresponding to a user's device to be registered. Then, associated with the discovered context, the system logs risk value points associated with the measured context at 359 for accumulation.

In one embodiment, to determine context, the application may receive data from external detectors or sensors (not shown) and recognize a piece of data that it receives (e.g., a car vehicle identification number (VIN) number, or a laptop's serial number). In a further non-limiting example, a mobile application may detect the VIN number of the car it is in and will match it with an already stored VIN. In a further implementation, a mobile application communicates with the laptop or desktop in the office inside a company building. In each of the above scenario implementations, the mobile phone application acquires bits of user identity/context using Near Field Communication, e.g., Blue-tooth, for this purpose. If the device moves out of range (e.g., a defined proximity limit such as 20 feet), the data may be dropped. In essence there is built a context based on different system(s) user's engagement(s) that could accept authentication challenge and reduce the burden of amount of authentication.

Figure 5:
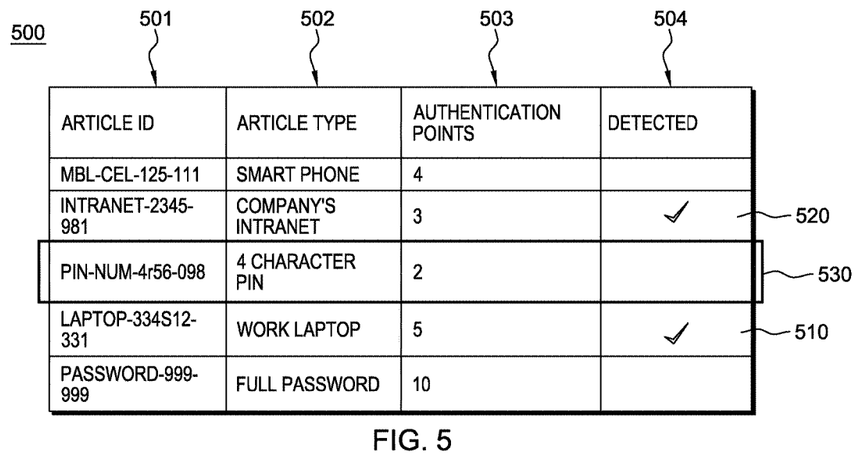
FIG. 5 shows an example enforcement of business rules and data structures maintained for tracking user contexts in the user device to be authenticated, e.g., a mobile phone device, in an example embodiment.

FIG. 5 shows example enforcement of business rules and tracking user contexts in the user device to be authenticated, e.g., a mobile phone device. As shown in FIG. 5, the user device determines (or receives) current user context data, and maintains the detected data, e.g., detection of context on the mobile phone. The data stored may be in the form of data table 500 shown in FIG. 5, indicating the relevant context device or articles each identified by an article ID 501, the corresponding article type 502, the corresponding number of authentication points or business-assessed risk value 503 and, further whether there has been detected a corresponding user/device context based on the business policy rules 504, e.g., devices such as mobile phones, mobile computing devices, etc., within a company network infrastructure. Thus, for the mobile phone authenticating example, assuming the business rule indicating contexts and associated authentication points values stored in the Table 400 of FIG. 4, the application tracks, and populates entry 510 in the table the fact that the detected context includes the user's work laptop (by its Article ID or exact laptop serial number) within the threshold proximity of the mobile phone device being authenticated and accumulates the authentication points value of five (5) authentication points. The additional system detection of the user's laptop being already connected/logged in to the company intranet populates table entry 520 with three (3) additional authenticating points value rendering a total of 8 points accumulated based on the detected user contexts 510, 520. The business rule requires the number authentication points needed (10 points) minus the current aggregated user context of 8 points to result in a 2 points difference. According to the business rule for that article, the application determines a corresponding authentication challenge of (2) points as shown at highlighted table entry 530, in this example, which 2 point difference maps to a user device authentication challenge of reduced complexity as compared to the user authentication challenge according to a 10 point value. In other embodiments, it may resolve to a challenge according to a 1 point value.

Figure 6:
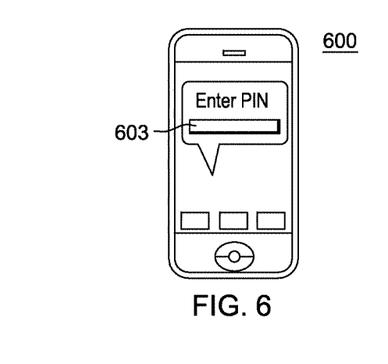
FIG. 6 depicts a mobile device interface via which the user is prompted to enter the corresponding user authentication challenge.

Thus, for example, given that the user's cell phone is in the company premises and close to his/her laptop, using NFC technology, then the cell phone is detected near laptop, and the laptop is inferred within the premise such that the engine running on the user's cell phone logs nine (9) authentication points as predefined by the rule. FIG. 6 depicts a mobile device interface, e.g., screen display 600, via which the user is prompted to enter the corresponding user authentication challenge corresponding to only the two (2) authentication points needed in entry field 603. Thus, for example, the authentication requirement presented for the delta 2 points may correspond to the user entering a 4-digit pin number on his/her cell phone device which is easier than the authentication challenge presented to that user that currently has none or little context. For example, the same user while being at home and not near or logged onto a system by any other logged in authentication scheme may enter the full 10 points authentication challenge for this mobile device as this corresponds to virtually no or little context (a higher risk value). A more challenging corresponding user authentication scheme is required e.g., a full 8 password rule, or requiring use of letters, sets of numbers, with no reusing numbers, etc. While the presented with 8 digit device authentication challenge may be really strong, the requirements of the business are not compromised. There is a built-in security context about the user associated with a risk. So the user enters full authentication, when of no context (much higher risk value) or, reduced challenge when of greater context (much lower risk value).

Thus, for an example implementation, when a user attempts to unlock his/her mobile phone, the application may be triggered to first check the authentication strength against the authentication threshold (total amount of total points to be achieved). If it equal or exceeds the threshold, it either unlocks the phone right away or prompt user for the further reduced authentication. If the threshold is not crossed, the user is prompted for a full authentication.

Figure 7:
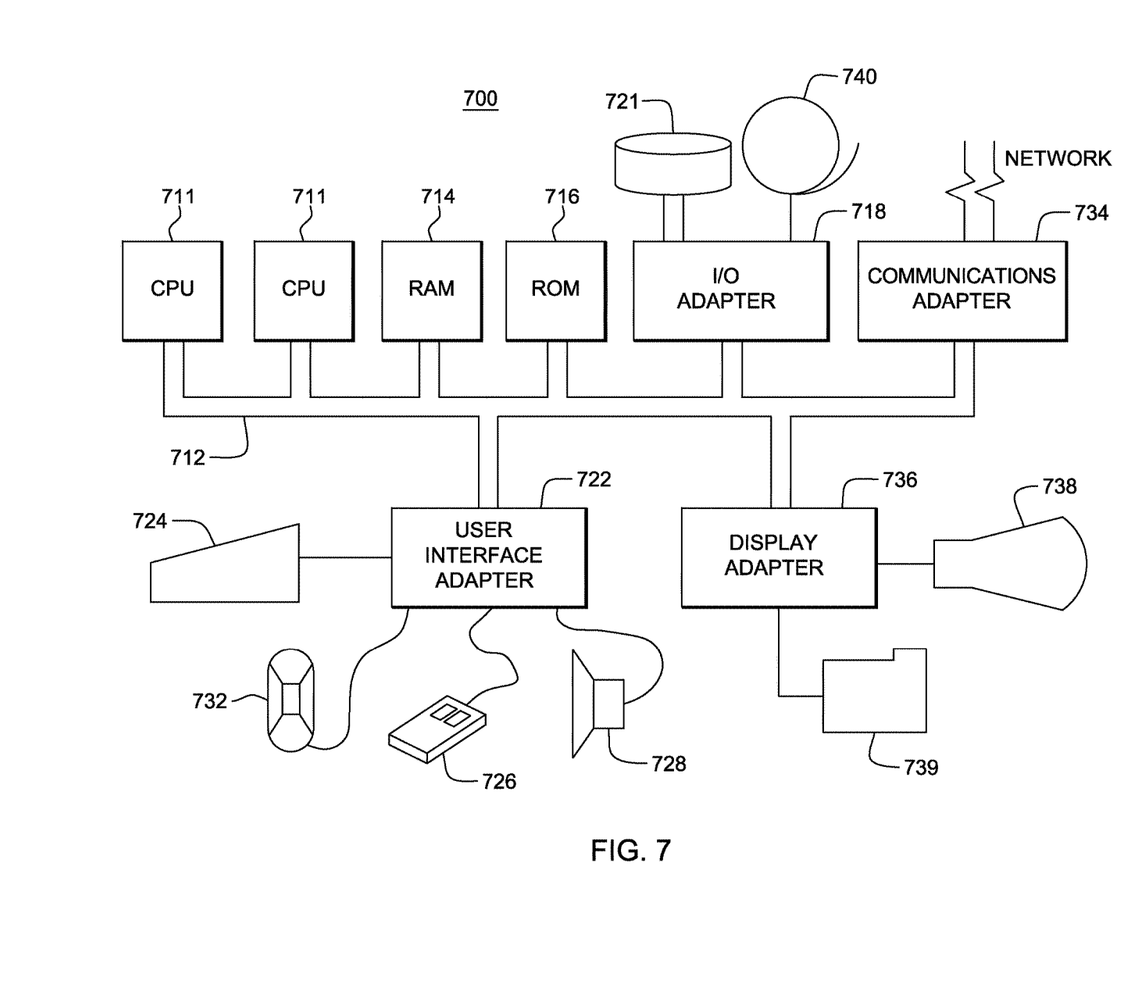
FIG. 7 illustrates an exemplary hardware configuration of a computing system infrastructure 700 in which the present methods are run.

FIG. 7 illustrates an exemplary hardware configuration of a mobile device or computing system infrastructure 700 in which the present methods of FIGS. 2 and 3A-3C are programmed to run. In one aspect, computing system 700 receives or accesses the user context data, and is programmed to aggregate and determine an appropriate authentication challenge according to the business rules. That is, FIG. 7 provides the system infrastructure to run methods that associates a risk modification score based on the context of a user. Once the risk modification value has been determined, that value is used to modify the authentication process and password rule-set for any participating security system. The system of FIG. 7 provides the ability for devices to communicate and gather pieces of data that pertain to the user's personal identification. The system implements methods to match the data against stored data to compute an authentication risk value. Based on the authentication risk, the system determines what changes to the authentication requirements are in order to unlock a device or in order to login to an enterprise network, for example.

The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, disk drive device 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing. The computer readable medium excludes only a propagating signal.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for authenticating a user device requesting access to a system or network resource of an entity, said method comprising:

determining, via said user device, that a first context of a user of said user device has been met, the first context having a first pre-defined authentication value;

determining, via said user device, that at least a second context of the user of said user device has been met, the second context having a second pre-defined authentication value;

computing an aggregated authentication value from at least the first and second pre-defined authentication values;

determining a required authentication value, the required authentication value comprising a minimum value that is required to authenticate the user of said user device;

comparing the required authentication value to the aggregated authentication value;

determining based on the comparison that the aggregated authentication value does not meet the required authentication value;

in response to determining based on the comparison that the aggregated authentication value does not meet the required authentication value, determining a difference between the required authentication value and the aggregated authentication value;

identifying, based on the difference, a first authentication challenge to be used for authentication of the user from a plurality of authentication challenges, each of the plurality of authentication challenges having a pre-defined authentication value, the first authentication challenge having a third pre-defined authentication value that, when aggregated with the aggregated authentication value, is sufficient to meet the required authentication value, the first authentication challenge having a reduced complexity as compared to a second authentication challenge of the plurality of authentication challenges, the second authentication challenged having a fourth pre-defined authentication value that is, on its own, sufficient to meet the required authentication value without the determination that the first and second contexts have been met; and presenting the first authentication challenge to the user of said user device as an authentication challenge that the user is required to meet for authentication.

2. The method as claimed in claim 1, wherein prior to authenticating said user device, said method further comprises:
   pre-registering one or more user devices with said entity; and
   obtaining at each of said one or more user devices, one or more authentication rules, each authentication rule listing a context of said user and corresponding individual pre-defined authentication values associated with the listed context of said user.

3. The method as claimed in claim 1, wherein at least one of the first and second contexts comprises one or more of:
   a type of said user device;
   a location of said user device; and
   whether said location of said user device is within a prescribed geographical boundary.

4. The method as claimed in claim 1, wherein said determining one or more contexts of said user via said user device comprises:
   determining an interaction of said user device with another resource of said entity.

5. The method as claimed in claim 1, wherein the user device includes an authentication rule that indicates a prescribed geographical boundary, said determining one or more contexts of said user comprising:
   obtaining a current location of the user device; and
   comparing said obtained current location against said prescribed geographical boundary.

6. The method as claimed in claim 1, further comprising:
   using at least one of a Near Field Communications system and a Global Positioning System to determine a current distance between said user device and a pre-registered device of said user, said pre-registered device of said user having been pre-registered with said system or network resource of said entity;
   determining that the current distance between said user device and said pre-registered device of said user is below a pre-determined threshold distance; and
   determining that at least one of the first and second contexts is met based on the determination that the current distance between said user device and said pre-registered device of said user is below the pre-determined threshold distance.

7. The method of claim 1, wherein identifying, based on the difference, the first authentication challenge to be used for authentication of the user comprises:
   comparing the difference to the pre-defined authentication values of the plurality of authentication challenges;
   determining, based on the comparison of the difference to the pre-defined authentication values of the plurality of authentication challenges, an authentication challenge of the plurality of authentication challenges that has a minimum necessary pre-defined authentication value sufficient to meet the required authentication value when aggregated with the aggregated authentication value; and
   identifying the determined authentication challenge as the first authentication challenge.

8. A system for authenticating a user device requesting access to a system or network resource of an entity, said system comprising:
   a memory device;
   a processor unit in communication with said memory device, said processor unit configured to:
      determine, via said user device, that a first context of a user of said user device has been met, the first context having a first pre-defined authentication value;
      determine, via said user device, that at least a second context of the user of said user device has been met, the second context having a second pre-defined authentication value;
      compute an aggregated authentication value from at least the first and second pre-defined authentication values;
      determine a required authentication value, the required authentication value comprising a minimum value that is required to authenticate the user of said user device;
      compare the required authentication value to the aggregated authentication value;
      determine based on the comparison that the aggregated authentication value does not meet the required authentication value;
      in response to determining based on the comparison that the aggregated authentication value does not meet the required authentication value, determine a difference between the required authentication value and the aggregated authentication value;
      identify, based on the difference, a first authentication challenge to be used for authentication of the user from a plurality of authentication challenges, each of the plurality of authentication challenges having a pre-defined authentication value, the first authentication challenge having a third pre-defined authentication value that, when aggregated with the aggregated authentication value, is sufficient to meet the required authentication value, the first authentication challenge having a reduced complexity as compared to a second authentication challenge of the plurality of authentication challenges, the second authentication challenged having a fourth pre-defined authentication value that is, on its own, sufficient to meet the required authentication value without the determination that the first and second contexts have been met; and
      present the first authentication challenge to the user of said user device as an authentication challenge that the user is required to meet for authentication.

9. The system as claimed in claim 8, wherein prior to authenticating said user device, said processor unit is further configured to:
   pre-register one or more user devices with said entity; and
   obtain at each of said one or more user devices, one or more authentication rules, each authentication rule listing a context of said user and corresponding individual pre-defined authentication values associated with the listed context of said user.

10. The system as claimed in claim 8, wherein at least one of the first and second contexts comprise one or more of:
   a type of said user device;
   a location of said user device; and
   whether said location of said user device is within a prescribed geographical boundary.

11. The system as claimed in claim 8, wherein to determine one or more contexts of said user via said user device, said processor unit is further configured to:
   determine an interaction of said user device with another resource of said entity.

12. The system as claimed in claim 8, wherein the user device includes an authentication rule that indicates a prescribed geographical boundary, and to determine one or more contexts of said user, said processor unit is further configured to:
   obtain a current location of the user device; and
   compare said obtained current location against said prescribed geographical area boundary.

13. The system as claimed in claim 8, wherein said processing unit is further configured to:
  use at least one of a Near Field Communications system and a Global Positioning System is used to determine a current distance between said user device and a pre-registered device of said user, said pre-registered device of said user having been pre-registered with said system or network resource of said entity;
  determine that the current distance between said user device and said pre-registered device of said user is below a pre-determined threshold distance; and
  determine that at least one of the first and second contexts is met based on the determination that the current distance between said user device and said pre-registered device of said user is below said pre-determined threshold distance.

14. The system of claim 8, wherein identifying, based on the difference, the first authentication challenge to be used for authentication of the user comprises:
  comparing the difference to the pre-defined authentication values of the plurality of authentication challenges;
  determining, based on the comparison of the difference to the pre-defined authentication values of the plurality of authentication challenges, an authentication challenge of the plurality of authentication challenges that has a minimum necessary pre-defined authentication value sufficient to meet the required authentication value when aggregated with the aggregated authentication value; and
  identifying the determined authentication challenge as the first authentication challenge.

15. A computer program product for authenticating a user device requesting access to a system or network resource of an entity, said program product comprising:
  a storage medium, the medium not a propagating signal, readable by a processor and storing instructions for execution by the processor for performing a method comprising:
  determining, via said user device, that a first context of a user of said user device has been met, the first context having a first pre-defined authentication value;
  determining, via said user device, that at least a second context of the user of said user device has been met, the second context having a second pre-defined authentication value;
  computing an aggregated authentication value from at least the first and second pre-defined authentication values;
  determining a required authentication value, the required authentication value comprising a minimum value that is required to authenticate the user of said user device;
  comparing the required authentication value to the aggregated authentication value;
  determining based on the comparison that the aggregated authentication value does not meet the required authentication value;
  in response to determining based on the comparison that the aggregated authentication value does not meet the required authentication value, determining a difference between the required authentication value and the aggregated authentication value;
  identifying, based on the difference, a first authentication challenge to be used for authentication of the user from a plurality of authentication challenges, each of the plurality of authentication challenges having a pre-defined authentication value, the first authentication challenge having a third pre-defined authentication value that, when aggregated with the aggregated authentication value, is sufficient to meet the required authentication value, the first authentication challenge having a reduced complexity as compared to a second authentication challenge of the plurality of authentication challenges, the second authentication challenged having a fourth pre-defined authentication value that is, on its own, sufficient to meet the required authentication value without the determination that the first and second contexts have been met; and
  presenting the first authentication challenge to the user of said user device as an authentication challenge that the user is required to meet for authentication.

16. The computer program product as claimed in claim 15, wherein prior to authenticating said user device, said method further comprises:
  pre-registering one or more user devices with said entity; and
  obtaining at each of said one or more user devices, one or more authentication rules, each authentication rule listing a context of said user and corresponding individual pre-defined authentication values associated with the listed context of said user.

17. The computer program product as claimed in claim 15, wherein at least one of the first and second contexts comprises one or more of:
  a type of said user device;
  a location of said user device; and
  whether said location of said user device is within a prescribed geographical boundary.

18. The computer program product as claimed in claim 15, wherein said determining one or more contexts of said user via said user device comprises:
  determining an interaction of said user device with another resource of said entity.

19. The computer program product as claimed in claim 15, the method further comprising:
  using at least one of a Near Field Communications system and a Global Positioning System to determine a current distance between said user device and a pre-registered device of said user, said pre-registered device of said user having been pre-registered with said system or network resource of said entity;
  determining that the current distance between said user device and said pre-registered device of said user is below a pre-determined threshold distance; and
  determining that at least one of the first and second contexts is met based on the determination that the current distance between said user device and said pre-registered device of said user is below the pre-determined threshold distance.

20. The computer program product as claimed in claim 15, wherein identifying, based on the difference, the first authentication challenge to be used for authentication of the user comprises:
  comparing the difference to the pre-defined authentication values of the plurality of authentication challenges;
  determining, based on the comparison of the difference to the pre-defined authentication values of the plurality of authentication challenges, an authentication challenge of the plurality of authentication challenges that has a minimum necessary pre-defined authentication value sufficient to meet the required authentication value when aggregated with the aggregated authentication value; and identifying the determined authentication challenge as the first authentication challenge.

* * * * *